United States Patent Office 3,657,295
Patented Apr. 18, 1972

3,657,295
PREPARATION OF TRI-n-BUTYL VANADATE
David R. McCoy, Wappingers Falls, N.Y., assignor to
Texaco Inc., New York, N.Y.
No Drawing. Filed Nov. 23, 1970, Ser. No. 92,213
Int. Cl. C07f 9/00
U.S. Cl. 260—429 R          7 Claims

ABSTRACT OF THE DISCLOSURE

Tri-n-butyl vanadate is produced in significantly high yields when vanadium pentoxide ($V_2O_5$) is reacted with n-butanol in the presence of toluene. A stoichiometric excess of n-butanol further enhances the improved yields. Yields are further improved in a preferred embodiment when condensed vapors of butanol and toluene pass through a quantity of vanadium pentoxide and are returned to a refluxing quantity of butanol and toluene.

BACKGROUND OF THE INVENTION

This invention relates to a process for the preparation of butyl vanadate. In particular, this invention relates to an improved process for the preparation of tri-n-butyl vanadate wherein the product is produced in significantly higher yields than obtained heretofore.

There are several approaches to the synthesis of tri-n-butyl vanadate. In one, vanadium oxytrichloride is reacted with butanol followed by addition of ammonia gas.

(1) $VOCl_3 + 3C_4H_9OH + 3NH_3 \rightarrow$
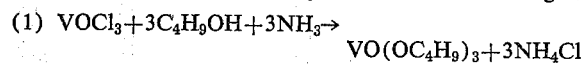
$VO(OC_4H_9)_3 + 3NH_4Cl$ In another ethyl vanadate is transesterified with either butanol or butyl acetate.

(2) $VO(OC_2H_5)_3 + 3C_4H_9OH$ (or $CH_3COOC_4H_9$) $\rightarrow$
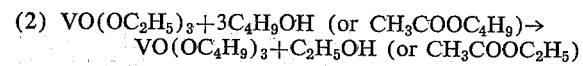
$VO(OC_4H_9)_3 + C_2H_5OH$ (or $CH_3COOC_2H_5$)

In still another butanol is reacted with vanadium pentoxide.

(3) $V_2O_5 + 6C_4H_9OH \rightarrow 2VO(OC_4H_9)_3 + 3H_2O$

Because of the relative difficulties and expenses in a transesterification technique the first and third methods are preferred. Further, although the product is normally obtained in a higher yield in reaction 1 than reaction 3, the latter is often preferred from an economic standpoint because of the great difference in starting material costs—vanadium pentoxide is significantly cheaper than vanadium oxytrichloride.

In preparing butyl vanadate by the reaction of butanol with vanadium pentoxide, it is known to reflux the reactant with benzene while removing water of reaction as an azeotropic mixture. By this method, yields of tri-n-butyl vanadate between 10–32% have been achieved during reaction times of 8–12 hours when stoichiometric quantities of reactants were employed.

Modifications to the prior art process which will result in significantly higher yields of a tri-n-butyl vanadate are desirable and are the objective of this invention.

SUMMARY

Broadly, this invention is directed to improvements in a process of preparing tri-n-butyl vandate by the reaction of n-butanol with vanadium pentoxide. Specifically, the improvements are achieved by employing toluene as a reaction solvent thereby obtaining the desired product in significantly enhanced yields. Further improvements are achieved by employing butanol in a 30 to 40 mole percent stoichiometric excess and, in a particularly preferred embodiment, by refluxing a mixture of toluene and butanol with the returning condensed liquid being passed through a body of vanadium pentoxide to introduce this reactant into the reaction vessel.

Tri-n-butyl vanadate finds utility as a polymerization catalyst or co-catalyst and, particularly, as one of the co-catalysts in a Ziegler-Natta catalyst system used in the polymerization of olefins.

DESCRIPTION OF THE PREFERRED EMBODIMENT

Broadly, I have found that significant improvements can be made in the yield of tri-n-butyl vanadate prepared by reacting vanadium pentoxide with n-butanol if toluene is used as a solvent in the reaction. Although the solvent takes no part in the reaction, its function is thought to be forming an azetotrope with the water of formation which can be removed by refluxing the reaction mixture during the course of the reaction.

More specifically, my improvements comprise:

(a) reacting vanadium pentoxide and n-butanol in the presence of toluene,
(b) removing water of formation, and
(c) recovering tri-n-butyl vanadate.

The water of formation is removed as part of an azeotrope while the reaction is conducted under refluxing conditions. Ideally, an inert atmosphere should blanket the system to prevent decomposition of the product. Further improvements in the yield of product are achieved by maintaining a stoichiometric excess of n-butanol. A 30–40 mole percent excess is preferred since excessive quantities as high as 67 mole percent do not effect any further increase in product yield.

The preferred solvent in the process of my reaction is toluene which should be used, preferably, in a volume ratio to butanol of 1:1 to 3:1. The lower limit is dependent on the minimum amount of solvent necessary to form an azeotrope with water. The upper limit is dependent on economic considerations and the fact that excessive amounts of solvent lead to slower reaction rates.

The reaction may be conducted by admixing the required quantities of vanadium pentoxide, n-butanol and toluene in a reaction vessel and refluxing the reactor contents while maintaining an inert gas blanket over the reaction mixture. During the refluxing operation the condensed liquid should be passed through a trap where a hydrocarbon rich layer and a water rich layer will form. Drawing off the water rich layer will remove at least a portion of the water of formation while the remaining liquid is returned to the reactor. Toluene forms an azeotrope with water having a boiling point of 83.1° C. and a water content of 19.6 wt. percent (the boiling point of toluene and n-butanol are 101.7 and 117.7° C., respectively).

The use of toluene as the solvent improves the yield of tri-n-butyl vanadate over that obtained heretofore with benzene even though the reactants are combined in stoichiometric quantities, i.e., a mole ratio of n-butanol to vanadium pentoxide of 6 to 1. Utilizing a reactant mole ratio of 8 to 1, stoichiometric excess of butanol, further enhances the product yield but a reactant ratio as high as 10 to 1 does not appear to have any further effect on improving the product yield.

In a particularly preferred embodiment only butanol and toluene are combined in the reactor, then heated under refluxing conditions, as in the above described embodiment, and passed through a trap for removal of the water rich phase which will develop during the reaction. However, before the hydrocarbon rich phase is returned to the reactor it is passed through an extractor containing a quantity of vanadium pentoxide, thereby slowly extracting this reactant and introducing it into the reaction vessel. Significantly high product yields are obtained by this procedure.

The following examples exemplify the practice of this invention and demonstrate its advantages over the prior art practices.

EXAMPLE I

A 500 ml. flask equipped with a side arm for introduction of nitrogen is connected to a Dean-Stark trap and condenser and charged with 44.5 grams (0.6 mole) of n-butanol, 18.2 grams (0.1 mole) of vanadium pentoxide and 200 ml. of benzene. The mixture was refluxed under a blanket of nitrogen. A water rich phase and a hydrocarbon rich phase were formed in the trap; the hydrocarbon layer was continuously returned to the reactor flask while the water rich phase was periodically removed. After refluxing for 16 hours, the reaction mixture was cooled, filtered and distilled to obtain 11.4 grams of tri-n-butyl vanadate. This product, obtained in a 20 mole percent yield, was identified by means of boiling point, refractive index, vanadium content and infra-red spectrum measurements.

EXAMPLE VIII

A reaction was conducted as in Example VI except that 2.0 moles of n-butanol were employed. A product yield of 60.5 mole percent was obtained.

EXAMPLE IX

In an exemplification of a preferred embodiment, the apparatus was assembled as in Example I with a Soxhlet extraction cup placed in such a fashion that the condensed liquid returning to the reactor flask passed through it. 0.6 mole of n-butanol and 120 ml. of toluene were added to the flask and 0.1 moles of vanadium pentoxide were placed in the extractor cup. During the refluxing of the contents of the flask the hydrocarbon rich phase returning to the flask passed through the cup continuously extracting the vanadium pentoxide and introducing it gradually into the flask. After refluxing for 16 hours, the tri-n-butyl vanadate product was recovered from the flask by distillation. No filtration of the product was necessary. A 55 mole yield yield of product was obtained.

A summary of the results obtained in these examples is presented in Table I below

TABLE I

| Example | n-$C_4H_9OH$, moles (relative amount) | Solvent | Reaction time, hrs. | Yield of TNBV,[1] mole percent |
|---|---|---|---|---|
| I | 0.6 (stoichiometric) | Benzene | 16 | 20 |
| II | do | Xylene | 16 | 0 |
| III | do | Toluene | 16 | 42 |
| IV | 0.8 (33% excess) | Benzene | 88 | 41 |
| V | do | Toluene | 16 | 54.5 |
| VI | 1.6 (33% excess) | do | 16 | 62 |
| VII | do | do | 24 | 65 |
| VIII | 2.0 (67% excess) | do | 16 | 60.5 |
| IX | 0.6 (stoichiometric) | do | 16 | 55 |

[1] Tri-n-butyl vanadate.

EXAMPLE II

A reaction was conducted as in Example I except that xylene (120 ml.) was used as the solvent instead of benzene. No tri-n-butyl vanadate was obtained.

EXAMPLE III

A reaction was conducted as in Example I except that toluene (120 ml.) was used instead of benzene. The volume ratio of toluene to butanol was about 2.2. A 42 mole percent yield of tri-n-butyl vanadate was obtained.

EXAMPLE IV

A reaction was conducted as in Example I using benzene as a solvent and 0.8 mole of n-butanol. The product was obtained in a 41 mole percent yield after refluxing for 88 hours.

EXAMPLE V

Another reaction was conducted as in Example I except that toluene (120 ml.) served as the solvent and 0.8 mole of butanol were employed. A product yield of 54 mole percent was obtained.

EXAMPLE VI

Another reaction was conducted as in Example I except that toluene (120 ml.) was the solvent and 0.2 mole vanadium pentoxide and 1.6 moles of n-butanol were employed. A 62 mole percent yield of tri-n-butyl vanadate was obtained.

EXAMPLE VII

A reaction was conducted as in Example VI except that a 24 hour reflux period was employed. A product yield of 65 mole percent was obtained.

A study of these results shows the advantages and the unexpected increase in yield of the process of my invention over the procedure practiced heretofore. Example I, utilizing stoichiometric quantities and a benzene solvent, is exemplary of the prior art and demonstrates a 20 mole percent yield of tri-n-butyl vanadate (TNBV). Example II demonstrates that with xylene as a solvent no product was obtained while in Example III, demonstrating the process of this invention, the use of toluene as a solvent with stoichiometric quantities of reactants produces a yield of 42%. Examples IV through VIII demonstrate the increase in yield through the use of excess quantities of butanol. Example IV, again demonstrating the prior art with benzene as a solvent, shows a yield of 41 mole percent of product when a 33 mole percent excess of n-butanol is used. Examples V to VII demonstrate that with the same excess of n-butanol and with toluene as a solvent significantly higher yields, ranging from 54 to 65 mole percent, are achieved by my invention. Example VIII demonstrates that no significant increase in yield is obtained by employing a 67 mole percent excess of n-butanol.

Example IX illustrates a preferred embodiment of my invention wherein the condensing vapors extract the vanadium pentoxide, gradually introducing it into the reaction vessel. Utilizing stoichiometric quantities of reactants in a toluene solvent a 55 mole percent yield of tri-n-butyl vanadate is obtained as compared with Example III wherein a different procedure with the same solvent and same quantity of reactants, produced a 42 mole percent product yield.

Obviously many modifications and variations of the invention, as hereinbefore set forth, may be made without departing from the spirit and scope thereof and therefore only such limitations should be imposed as are indicated in the appended claims.

I claim:

1. In a process of preparing tri-n-butyl vanadate by reacting together vanadium pentoxide and n-butanol in the presence of a hydrocarbon solvent under refluxing conditions whereby water of formation is removed from the reaction mixture, the improvement which comprises employing toluene as the hydrocarbon solvent.

2. A process according to claim 1 wherein the volume ratio of toluene to n-butanol is 1:1 to 3:1.

3. A process according to claim 1 wherein n-butanol is present in a stoichiometric excess of 30–40 mole percent.

4. A process according to claim 1 wherein the process is conducted in the presence of an inert gas.

5. A process of preparing tri-n-butyl vanadate which comprises:
   (a) refluxing a mixture of toluene and n-butanol in a reaction zone,
   (b) passing the condensed hydrocarbon-rich liquid through a quantity of vanadium pentoxide whereby a portion of said vanadium pentoxide is extracted,
   (c) returning said hydrocarbon-rich liquid and said extracted portion to the reaction zone whereby the vanadium pentoxide and the n-butanol react yielding water and tri-n-butyl vanadate.
   (d) removing a water-rich liquid from the condensed refluxing vapors, and
   (e) recovering tri-n-butyl vanadate as a product from the reaction zone.

6. A process according to claim 5 wherein the volume ratio of toluene to n-butanol in step (a) is 1:1 to 3:1.

7. A process according to claim 5 wherein the process is conducted in the presence of an inert gas.

References Cited

Mittal et al.: Feitscheift für Amorg in Allgem. Chem. 13 and 327 (1964), pp. 311–4.

TOBIAS E. LEVOW, Primary Examiner

A. P. DEMERS, Assistant Examiner

U.S. Cl. X.R.

252—431 R